(12) United States Patent
Adrangi et al.

(10) Patent No.: US 11,032,707 B2
(45) Date of Patent: Jun. 8, 2021

(54) SERVICE AUTHORIZATION AND CREDENTIAL PROVISIONING FOR V2X COMMUNICATIONS

(71) Applicant: Intel IP Corporation, Santa Clara, CA (US)

(72) Inventors: Farid Adrangi, Lake Oswego, OR (US); Meiyuan Zhao, San Jose, CA (US); Alexandre Saso Stojanovski, Paris (FR)

(73) Assignee: Intel IP Corporation, Santa Clara, CA (US)

( * ) Notice: Subject to any disclaimer, the term of this patent is extended or adjusted under 35 U.S.C. 154(b) by 233 days.

(21) Appl. No.: 16/099,004

(22) PCT Filed: Sep. 26, 2016

(86) PCT No.: PCT/US2016/053825
§ 371 (c)(1),
(2) Date: Nov. 5, 2018

(87) PCT Pub. No.: WO2017/192161
PCT Pub. Date: Nov. 9, 2017

(65) Prior Publication Data
US 2019/0200228 A1    Jun. 27, 2019

Related U.S. Application Data

(60) Provisional application No. 62/332,901, filed on May 6, 2016.

(51) Int. Cl.
*H04L 29/06*      (2006.01)
*H04W 12/08*      (2021.01)
(Continued)

(52) U.S. Cl.
CPC .......... *H04W 12/08* (2013.01); *H04L 9/083* (2013.01); *H04L 9/0847* (2013.01);
(Continued)

(58) Field of Classification Search
CPC ......... H04W 12/08; H04W 4/70; H04W 4/40; H04W 12/0609; H04W 12/04031;
(Continued)

(56) References Cited

U.S. PATENT DOCUMENTS 8,615,218 B2 * 12/2013 Cho ................ H04W 12/04071
455/411
2004/0085926 A1 * 5/2004 Hwang ............ H04W 36/0055
370/328

(Continued)

FOREIGN PATENT DOCUMENTS

WO     WO-2017192161 A1    11/2017

OTHER PUBLICATIONS

Brecht, "A Security Credential Management System for V2X Communications", Dec. 2018, IEEE, vol. 19, pp. 3850-3871 (Year: 2018).*

(Continued)

*Primary Examiner* — Taghi T Arani
*Assistant Examiner* — Gregory A Lane
(74) *Attorney, Agent, or Firm* — Schwegman Lundberg & Woessner, P.A.

(57) ABSTRACT

Disclosed herein are user equipment (UE) configured to communicate with a vehicle-to-everything (V2X) control function (CF) and a V2X Key Management Function (KMF). The UE includes processing circuitry configured to select a broadcast service from a plurality of available broadcast services and encode a key request message for transmission to the V2X KMF. The key request message includes a service identification (ID) of the selected broad- (Continued)

cast service and identification of V2X security techniques supported by the UE. A key response message received from the V2X KMF in response to the key request message is decoded. The key response message identifies a V2X security technique of the V2X security techniques. The identified V2X security technique is execute to obtain security credentials provisioned by the V2X KMF. Data is encoded for transmission to a second UE during the selected broadcast service, where the encoding is based on the provisioned security credentials.

25 Claims, 7 Drawing Sheets (51) Int. Cl.
| | | |
|---|---|---|
| H04W 4/40 | (2018.01) | |
| H04W 4/70 | (2018.01) | |
| H04L 9/08 | (2006.01) | |
| H04L 9/32 | (2006.01) | |
| H04W 12/069 | (2021.01) | |
| H04W 12/0431 | (2021.01) | |
| H04W 4/06 | (2009.01) | |
| H04W 8/24 | (2009.01) | |
| H04W 8/26 | (2009.01) | |
| H04W 88/02 | (2009.01) | |

(52) U.S. Cl.
CPC .......... *H04L 9/3265* (2013.01); *H04L 9/3268* (2013.01); *H04L 63/0823* (2013.01); *H04W 4/06* (2013.01); *H04W 4/40* (2018.02); *H04W 4/70* (2018.02); *H04W 8/24* (2013.01); *H04W 8/26* (2013.01); *H04W 12/0431* (2021.01); *H04W 12/069* (2021.01); *H04L 2209/80* (2013.01); *H04W 88/02* (2013.01)

(58) Field of Classification Search
CPC ........... H04W 4/06; H04W 8/24; H04W 8/26; H04L 9/083; H04L 9/0847; H04L 9/3265; H04L 9/3268; H04L 63/0823
USPC ........................................................ 713/156
See application file for complete search history.

(56) References Cited

U.S. PATENT DOCUMENTS

| | | | | |
|---|---|---|---|---|
| 2004/0185837 | A1* | 9/2004 | Kim ................... | H04L 29/06027 455/414.3 |
| 2004/0259529 | A1* | 12/2004 | Suzuki .............. | H04M 1/72513 455/411 |
| 2005/0246533 | A1* | 11/2005 | Gentry ................... | H04L 9/0847 713/170 |
| 2005/0282571 | A1* | 12/2005 | Oprescu-Surcobe ........ | H04W 28/10 455/503 |
| 2008/0069347 | A1* | 3/2008 | Brown ................... | H04L 9/3252 380/45 |
| 2009/0158032 | A1* | 6/2009 | Costa ....................... | H04L 63/10 713/156 |
| 2009/0222657 | A1 | 9/2009 | Bender et al. | |
| 2010/0083347 | A1* | 4/2010 | Hinton .................... | H04L 9/3268 726/1 |
| 2011/0126272 | A1 | 5/2011 | Betzler et al. | |
| 2012/0027211 | A1 | 2/2012 | Lehtovirta et al. | |
| 2012/0263301 | A1* | 10/2012 | Lee ................... | H04W 12/0401 380/270 |
| 2013/0312072 | A1* | 11/2013 | van Roermund ..... | H04L 63/065 726/6 |
| 2014/0141763 | A1* | 5/2014 | Suh ...................... | H04L 41/0806 455/418 |
| 2015/0089236 | A1* | 3/2015 | Han ...................... | H04L 9/3242 713/181 |
| 2016/0112206 | A1* | 4/2016 | Cizas .................... | H04L 9/3263 713/158 |
| 2017/0041762 | A1* | 2/2017 | Colonna ............... | H04W 4/029 |
| 2017/0163608 | A1* | 6/2017 | Bicket ..................... | H04W 4/38 |

OTHER PUBLICATIONS

"International Application Serial No. PCT/US2016/053825, International Search Report dated Jan. 25, 2017", 3 pgs.
"International Application Serial No. PCT/US2016/053825, Written Opinion dated Jan. 25, 2017", 5 pgs.
Liting, Huang, "Secure and privacy-preserving broadcast authentication for IVC", Distributed and Embedded Security Group, Faculty of Electrical Engineering, Mathematics and Computer Science, Universiteit Twente, (Jul. 2, 2012), 1-64.
Norbert, Bibmeyer, et al., "Preparing Secure Vehicle-to-X Communication Systems", Deliverable 1.3, V2X Security Architecture v2, Preserve, Part of the Seventh Framework Program Funded by the EC-DG INFSO, (Jan. 31, 2014), 1-93.

* cited by examiner

SERVICE AUTHORIZATION AND CREDENTIAL PROVISIONING FOR V2X COMMUNICATIONS

PRIORITY CLAIM

This application is a U.S. National Stage Application under 35 U.S.C. 371 from International Application No. PCT/US2016/053825, filed Sep. 26, 2016, which claims the benefit of priority to U.S. Provisional Patent Application Ser. No. 62/332,901, filed May 6, 2016, and entitled "SECURE SERVICE AUTHORIZATION, CREDENTIAL PROVISIONING, AND COMMUNICATION FOR V2X DIRECT COMMUNICATION," each of which are incorporated herein by reference in their entirety.

TECHNICAL FIELD

Embodiments pertain to wireless communications. Some embodiments relate to wireless networks including 3GPP (Third Generation Partnership Project) networks, 3GPP LTE (Long Term Evolution) networks, 3GPP LTE-A (LTE Advanced) networks, and 5G networks, although the scope of the embodiments is not limited in this respect. Sonic embodiments relate to secure service authorization, credential provisioning and communication for vehicle-to-everything (V2X) direct communication.

BACKGROUND

With the increase in different types of devices communicating with various network devices, usage of 3GPP LTE systems has increased. The penetration of mobile devices (user equipment or UEs) in modern society has continued to drive demand for a wide variety of networked devices in a number of disparate environments. The use of networked UEs using 3GPP LTE systems has increased in all areas of home and work life. Fifth generation (5G) wireless systems are forthcoming, and are expected to enable even greater speed, connectivity, and usability.

Recent fast evolution of cellular systems, such as LTE-Advanced and 5G, aims to support diverse use cases in Internet of Things (IoT). In particular, the vehicle-to-everything (V2X) communication is the leading use case that drives the evolution in architecture enhancement and protocol design.

BRIEF DESCRIPTION OF THE FIGURES

In the figures, which are not necessarily drawn to scale, like numerals may describe similar components in different views. Like numerals having different letter suffixes may represent different instances of similar components. Some embodiments are illustrated by way of example, and not limitation, in the following figures of the accompanying drawings.

DETAILED DESCRIPTION

The following description and the drawings sufficiently illustrate specific embodiments to enable those skilled in the art to practice them. A number of examples are described in the context of 3GPP communication systems and components thereof. It will be understood that principles of the embodiments are applicable in other types of communication systems, such as Wi-Fi or Wi-Max networks, Bluetooth or other personal-area networks, Zigbee or other home-area networks, wireless mesh networks, and the like, without limitation, unless expressly limited by a corresponding claim. Given the benefit of the present disclosure, persons skilled in the relevant technologies will be able to engineer suitable variations to implement principles of the embodiments in other types of communication systems. Various diverse embodiments may incorporate structural, logical, electrical, process, and other differences. Portions and features of some embodiments may be included in, or substituted for, those of other embodiments. Embodiments set forth in the claims encompass all presently-known, and after-arising, equivalents of those claims.

As used herein, the term "user equipment" (or UE) includes a device which can be configured to provide LTE functionalities in a vehicle, a roadside unit (RSU), or another stationary (or mobile) entity.

Figure 1:
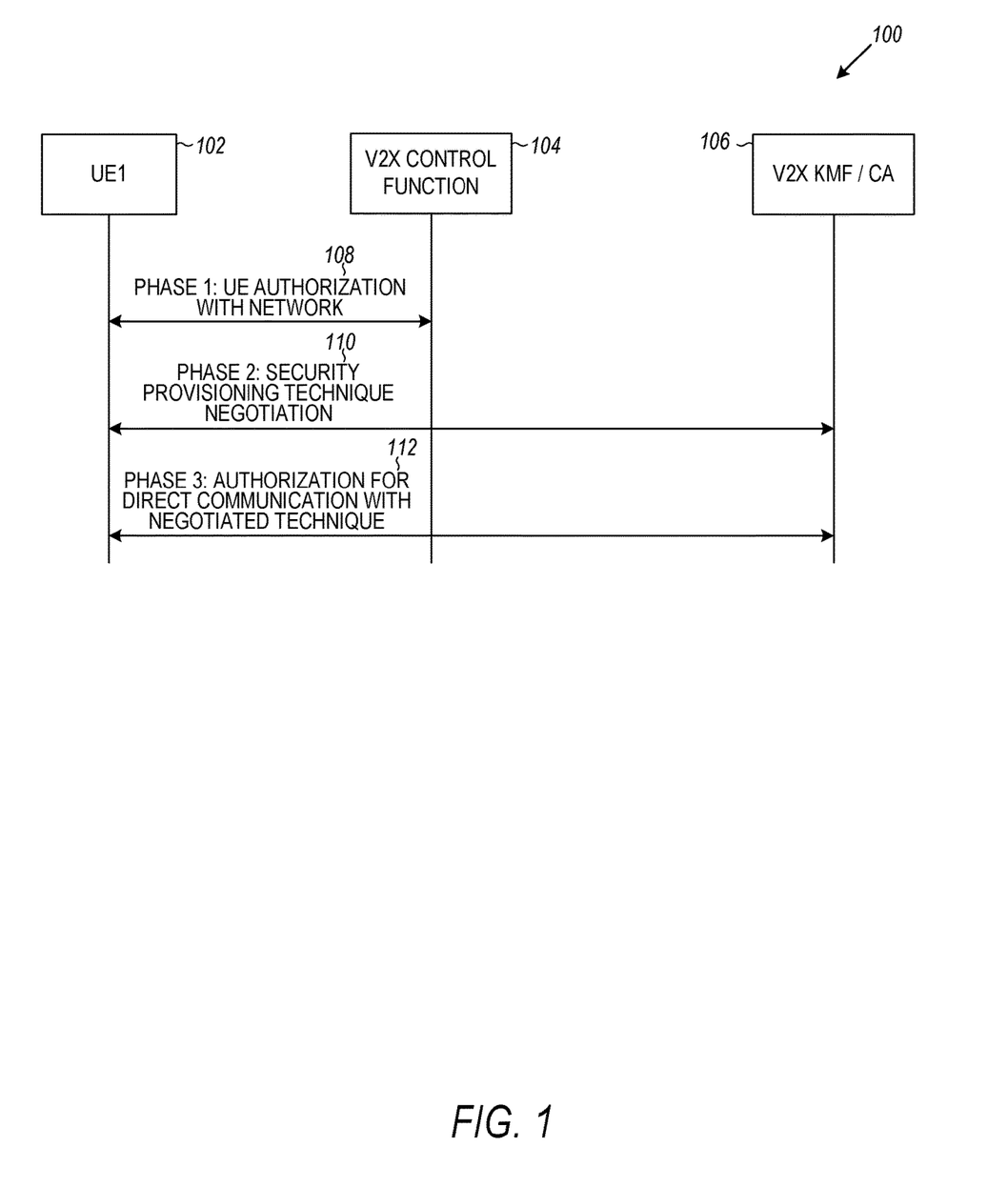
FIG. 1 is a diagram illustrating user equipment (UE) vehicle-to-everything (V2X) authorization for direct V2X communication, in accordance with an example embodiment.

FIG. 1 is a diagram illustrating user equipment (UE) vehicle-to-everything (V2X) authorization for direct V2X communication, in accordance with an example embodiment.

UE that supports V2X services needs to gain authorization from a V2X control function (CF) in the Public Land Mobile Network (PLMN) before UE can be authorized to engage in direct device-to-device (D2D) communication with other V2X UEs. In an example, an UE V2X authorization framework can be used to validate UE's V2X subscription credential and establish cryptographic key or certificate credentials for V2X UE to participate in secure V2X communications. Referring to FIG. 1, the V2X authorization framework 100 may include the UE 102, a V2X CF 104, and a V2X key management function (KMF) or a certification authority (CA) 106.

The V2X CF 104 may comprise suitable circuitry, logic, interfaces and/or code and can be implemented on one or more servers to manage the authorization of the V2X UE 102. In an example, the V2X CF 104 can be provided by (and be part of) a wireless/cellular network, such as an LTE or 5G network. The V2X KMF/CA 106 may comprise suitable circuitry, logic, interfaces and/or code and can be implemented on one or more servers to support security provisioning via identity-based cryptography (via V2X KMF), or public key certificate-based security provisioning (via V2X CA).

In an example, the V2X Key Management Function or Certification Authority 106 can be a separate logical entity to allow the network operator (e.g., the V2X control function 104) to provision the radio level parameters and a third party (e.g., a V2X service provider) to have control over provisioning the keys or certificates. In another example, in instances when such a separation of the V2X CF 104 and the V2X KMF/CA 106 is not needed, then the V2X KMF/CA 106 may be deployed as part of the V2X CF 104.

The V2X authorization framework 100 may include three phases—Phase 1 (108), Phase 2 (110), and Phase 3 (112). During Phase 1 (108), the UE 102 can be authorized to access the V2X CF 104 and its associated network (e.g., cellular network). During Phase 2 (110), the UE 102 can communicate with the V2X KMF/CA 106 to negotiate security credentials provisioning technique. For example, the UE 102 and the V2X KMF/CA 106 can negotiate on whether authorization is required for V2X communications (e.g., D2D communication between two or more UEs). If authorization is required, the UE 102 and the V2X KMF/CA 106 can determine whether identity-based cryptography or public key certificate can be used to provision security credentials for the UE 102 for purposes of V2X communication (e.g., direct communication with another UE). During Phase 3 (112), the UE 102 can invoke the negotiated security credentials provisioning technique for authorizing a handshake and direct communication among the UE 102, the V2X CF 104 and the V2X KMF/CA 106.

Figure 2:
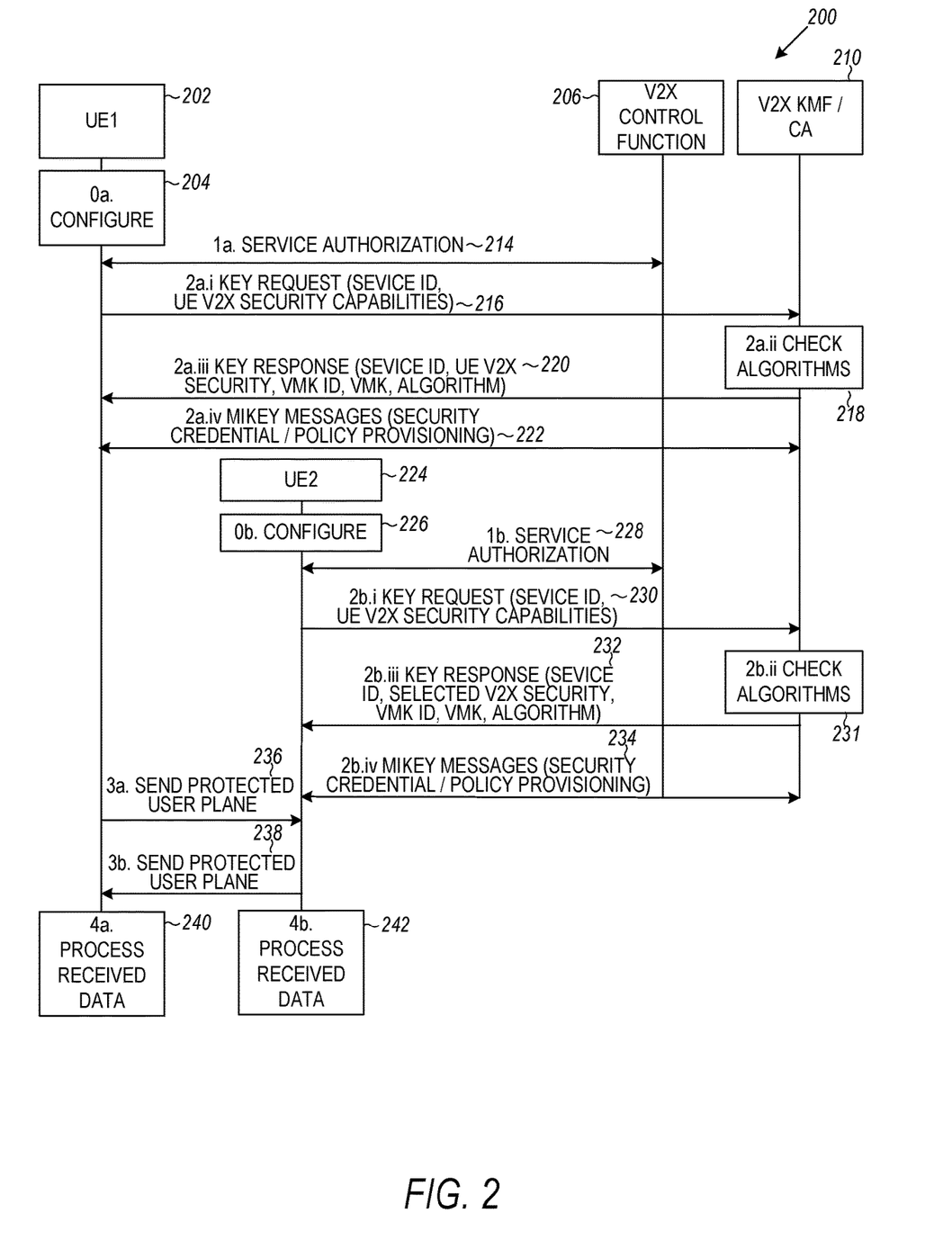
FIG. 2 is a diagram of a UE V2X authorization framework, in accordance with an example embodiment.

FIG. 2 is a diagram of a UE V2X authorization framework 200, in accordance with an example embodiment. Referring to FIG. 2, two separate UEs (202 and 224) may be configured for direct D2D communication using the V2X authorization framework 200. During initial configuration 204 and 226, UEs 202 and 224 may be configured with any private keys, associated certificates or root certificate that they may need for contacting the V2X KMF or CA 210 to allow the keys to be kept secret from the network operator (e.g., 206). If private keys, associated certificates or root certificate are not provided to UEs 202 and 224, then universal subscriber identity module (USIM) credentials of the UEs may be used to protect the communication interface with the V2X KMF/CA 210. In an example, the UEs 202 and 224 may also be pre-configured with the address of the V2X KMF/CA 210.

At 214 and 228, service authorization with the V2X CF 206 may be performed. The UEs 202 and 224 may fetch one-to-many communication parameters from the V2X CF 206 as part of the service authorization process. Additionally, the UEs 202 and 224 may receive a list of available services offered by the operators and affiliated service providers (e.g., from the V2X CF 206), and may be informed whether bearer layer security is needed for one or more of the available services. Furthermore, the UEs 202 and 224 may be provided with the address of the V2X KMF/CA 210 used for obtaining keys for a specified service.

At 216 and 230, the UEs 202 and 224 may each send a key request message to the V2X KMF 210. The key request message may include a Service ID identifying a communication service from the list of services for which it may need secure credentials (e.g., secure keys). The key request message may also identify the V2X security capabilities of the UEs 202 and 224 (e.g., a set of V2X security techniques that the UE supports). The security techniques may include identity-based cryptography (via a V2X KMF) or public key certificate-based security provisioning (via a V2X CA).

At 218 and 231, the V2X KMF/CA 210 may check whether the security technique associated with the identified communication service is supported by the UEs (i.e., whether a security technique required by the V2X KMF/CA for the identified service with the service ID is included in the set of V2X security techniques that the UEs supports, as identified in the key request message.

At 220 and 232, the V2X Key Management Function 210 may communicate a key response message to the UEs. In instances when the check of steps 218 and 231 is successful for the Service ID, the key response message contains the Service ID and identification of the V2X security technique that the UEs 202 and 224 can use for security credential/policy provisioning for V2X communication (e.g., between the two UEs 202 and 224). In instances when the check of steps 218 and 231 is unsuccessful, the key response message contains an indicator of algorithm support failure (e.g., indicator "Algorithm" as seen in FIG. 2) as the UE does not support the required algorithm. The key response message may also include a V2X MIKEY Key (VMK) and an associated VMK ID, in instances when the V2X Key Management Function 210 decides to use a new VMK.

Figure 3:
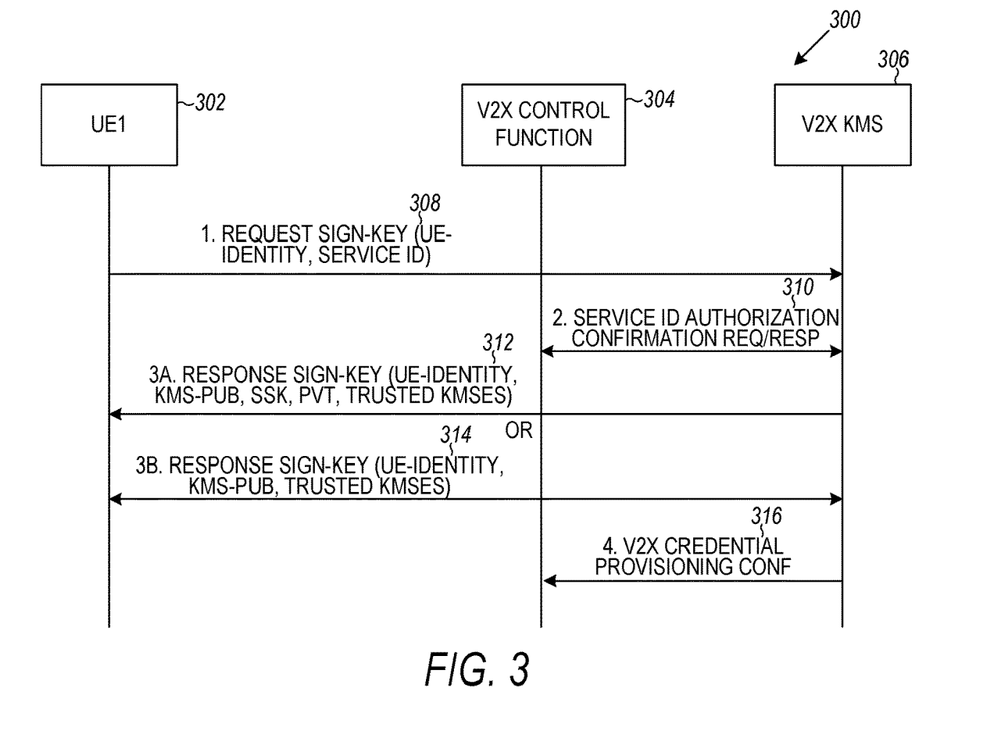
FIG. 3 is a diagram of UE security credential provisioning with identity-based cryptography, in accordance with an example embodiment.
Figure 4:
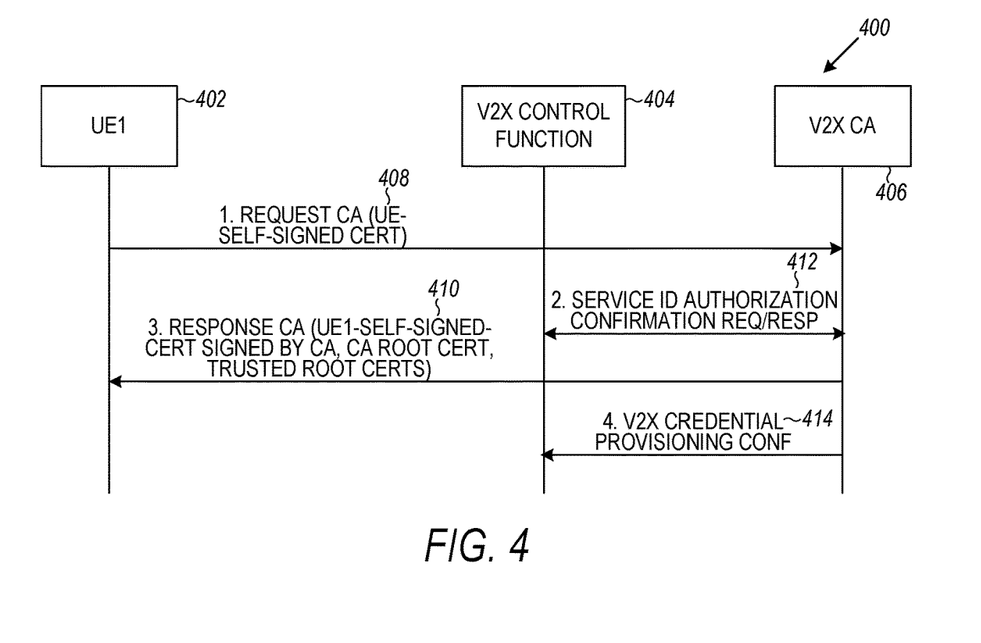
FIG. 4 is a diagram of UE security credential provisioning with certificate-based cryptography, in accordance with an example embodiment.

At 222 and 234, the UEs and V2X Key Management Function, with the assistance of the V2X certification authority or an identity-based key management services (collectively referenced as 210), may execute the selected security technique to complete security credential/policy provisioning using, e.g., Multimedia Internet Keying (MIKEY). FIGS. 3 and 4 (and corresponding description below) illustrate the detailed protocol message exchanges for provisioning UEs with security policy and credentials for identity and certification-based authentication and encryption respectively.

At 236 and 238, the UE 202 3a or 3b: The UE 202 uses the provisioned security credentials or policy to send/receive protected messages to/from another UE (e.g., 224) in a V2X D2D communication. AT 240 and 242, UEs 202 and 224 may process the received data via the D2D communication.

FIG. 3 is a diagram of UE security credential provisioning with identity-based cryptography, in accordance with an example embodiment. Referring to FIG. 3, the UE V2X authorization framework 300 may include UE 302, V2X CF 304, and V2X Key Management Server (KMS) 306. The V2X CF 304 and V2X KMS 306 may have similar functionalities to the V2X CF 206 and the V2X KMF 210, respectively.

In instances when the UE 302 has a secure access to the V2X KMS 306, the UE 302 may be provisioned with the required credentials in advance. The V2X KMS 306 may be a common root of trust for the UE 302, and may provision the UE with a set of security credentials for, e.g., Elliptic Curve-based Certificateless Signatures for Identity-based Encryption (ECCSI) and Sakai-Kasahara Key Exchange (SAKKE) schemes.

Upon successful provisioning for ECCSI, the UE 302 may be configured with the public key of the V2X KMS 306, and a set of credentials associated with the UE's identity, which may include a Secret Signing Key (SSK) and a Public Validation Token (PVT). The UE 302 may act as "signer" and/or a "verifier". As a signer, the UE 302 may use its SSK to sign a message, and when acting as a verifier, the UE 302 may use the public key of the V2X KMS 306 and the signer's PVT to verify the signature.

Upon successful provisioning for SAKKE, the UE 302 may be configured with the public key of the V2X KMS 306, and a Receiver Secret Key (RSK) which is associated with the UE's identity. The sender UE may use the receiver's UE identity (receiving entity for SAKKE payload) and the public key of the V2X KMS 306 to create an encrypted SAKKE payload. The receiving UE may use its identity and the public key of the V2X KMS 306 to decrypt the SAKKE payload.

The public identity of a UE may be a concatenation of a fixed part (in the form of an international mobile subscriber identity (IMSI) of the UE, a Session Initiation Protocol (SIP) Uniform Resource Identifier (URI) of the UE, a telephone (TEL) URI of the UE, other user@domain types of URI, etc.), and a varying part (e.g., in the form of a timestamp—identity credential expiration time). Additionally, the UE 302 may be configured with multiple sets of identity based credentials (with different expiration times) for purpose of key refreshment when UE is out of coverage. Lifetime of identity based credentials may be governed by security policy.

Referring to FIG. 3, at 308, the UE 302 may send a request to V2X KMS 306 to receive identity-based credentials for a specified service ID. The request may include one or more of the public identity characteristics described above. At 310, the V2X KMS 306 may exchange messages with the V2X CF 304 to obtain a confirmation that the UE 302 is qualified to be authorized for this service (i.e., the UE can be configured to perform one or more functionalities associated with the identified service with the service ID in the request message).

At 312, in instances when the UE 302 is to act as a signer and as a verifier, the V2X KMS 306 may send a response, including identity-based key credential materials, such as a Signing Secret Key (SSK), a Public Verification Token (PVT), a KMS Public Key (KMS_Pub), a KMS identity (ID) corresponding to the KMS_Pub (KMS_ID), and/or a list of Trusted KMS_ID and KMS_Pub pairs (Trusted_KMS_List). At 314, in instances when the UE 302 is to act only as a verifier, the V2X KMS 306 may send a response, including identity-based key credential materials, such as a KMS Public Key (KMS_Pub), a KMS identity (ID) corresponding to the KMS_Pub (KMS_ID), and/or a list of Trusted KMS_ID and KMS_Pub pairs (Trusted_KMS_List). At 316, the V2X KMS 306 may send a confirmation to the V2X CF 304 indicating that the UE 302 has been successfully provisioned with the credentials for the requested service ID.

FIG. 4 is a diagram of UE security credential provisioning with certificate-based cryptography, in accordance with an example embodiment. Referring to FIG. 4, the UE V2X authorization framework 400 may include UE 402, V2X CF 404, and a V2X Certification Authority (CA) 406. The V2X CF 404 and V2X CA 406 may have similar functionalities to the V2X CF 206 and the V2X KMF 210, respectively.

In an example, the UE 402 may be provisioned by the V2X CA 406 with a certificate in advance. The V2X certificate may represent the certificate holder UE's authority to participate in an authorized V2X communication. For example, a road side unit (RSU) UE (e.g., 402) may hold a certificate that authorizes it to send authority broadcast announcement on a road. The issuing CA (e.g., 406) may be a third party provisioning V2X service, hosted by a KMF. Upon successful provisioning of a certificate, the UE 402 may also receive a set of trusted root certificates of the CA 406 for authenticating other authorized V2X UEs during its operation (e.g., as a RSU on a road).

As depicted in FIG. 4, the protocol for UE security credential provisioning using a certificate includes a UE generating a self-signed certificate for the service that it requests to be authorized, confirmation by the V2X Control Function that UE can be authorized for this service by V2X Control function, and the V2X CA delivering UE authorization certificate, V2X CA root certificate, and trusted root certificates to the UE.

At 408, the UE 402 may send a request to the V2X CA 406 to receive certificate-based credentials for the specified service. The request may include a self-signed certificate issued by the UE. The certificate data (described herein below) includes the service ID for a broadcast service that the UE wants to be authorized. At 412, the V2X CA 406 may exchange messages with the V2X control function 404 to obtain a confirmation that the UE 402 is qualified to be authorized for this service. At 410, the V2X CA 406 may send a response to the UE 402 that includes UE-certificate signed by the CA 406, a CA root certificate, and a set of root certificates trusted by the V2X CA 406, as UE's trust anchor. At 414, the V2X CA 406 may send a confirmation to the V2X CF 404 indicating the UE 402 has been successfully provisioned with certificate-based credentials for the requested service ID.

Figure 5:
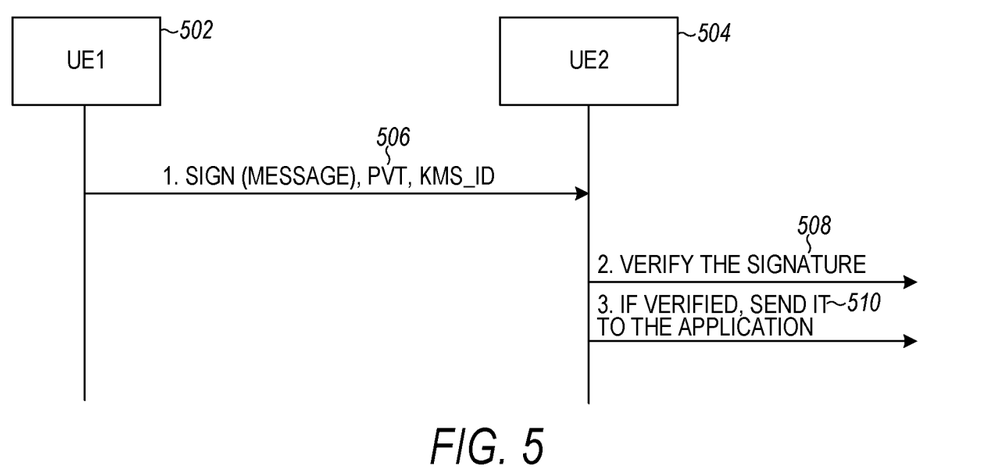
FIG. 5 is a diagram illustrating device-to-device (D2D) communication protected by identity-based authentication, in accordance with an example embodiment.

FIG. 5 is a diagram illustrating device-to-device (D2D) communication protected by identity-based authentication, in accordance with an example embodiment. The sender UE 502 may be V2X-authorized with identity-based authentication and may send signed broadcast messages. The receiver UE 504 of a signed broadcast message, with properly provisioned identity-based credentials, may verify the signature, and accept the message content as integrity and origin authenticity protected. This type of protection may be suitable for, e.g., UEs for RSU and authority vehicles.

At 506, the sender UE 502 may create a message and may sign it with its SSK, installed during the authorization phase with the KMS (e.g., as described in reference to FIG. 3). The message may also include the PVT and the KMS_ID. At 508, upon receipt of the message, the receiver UE 504 may verify the signature of the message using the KMS Public Key and the received PVT. The receiver UE 504 may use the received KMS-ID to retrieve the KMS public key from its installed <KMS-ID, KMS-Public Key> pairs. At 510, if the signature is verified, the received message may be sent to the UE receiver application to be processed.

Figure 6:
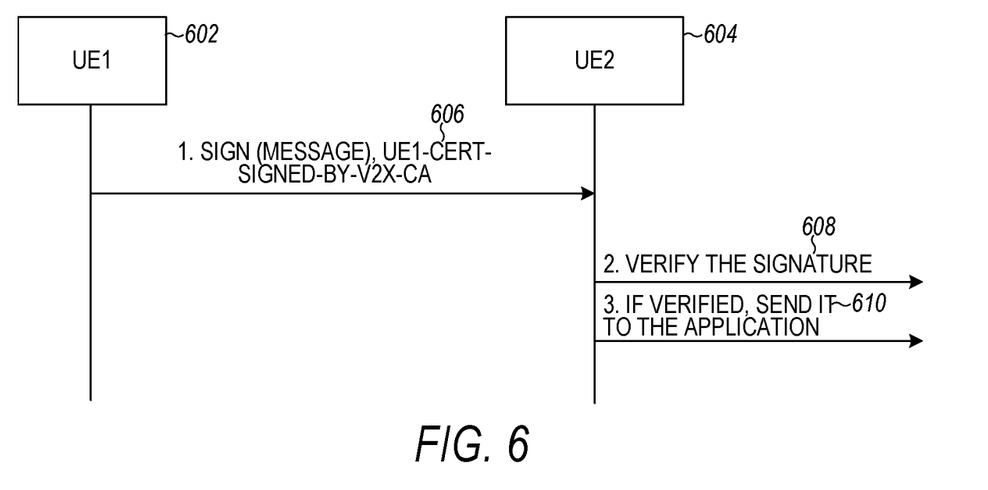
FIG. 6 is a diagram illustrating device-to-device (D2D) communication protected by certificate-based authentication, in accordance with an example embodiment.

FIG. 6 is a diagram illustrating device-to-device (D2D) communication protected by certificate-based authentication, in accordance with an example embodiment. Referring to FIG. 6, UE 602 may be a sending UE, and UE 604 may be a receiving UE. UEs with no V2X certificate may send broadcast messages without protection.

UEs with V2X authorization certificate may send a broadcast message protected by a signature on the message payload. The receiver UE (e.g., 604) of the signed broadcast message (with properly provisioned trust anchors) may validate the signer's certificate, verify the signature, and accept the message content as integrity and origin authenticity protected. This type of protection may be suitable for UEs for RSU and authority vehicles.

At 606, the sender UE 602 may send a signed message (e.g., signed by its private key) to the receiving UE 604. The UE 602 may also include in the sent message a certificate signed by the V2X CA. At 608, upon receipt of the message, the receiver UE 604 may verify the signature of the message using the UE 602 certificate (signed by the V2X CA). At 610, if the signature is verified, the message may be sent to the UE 604 application to be processed.

Figure 7:
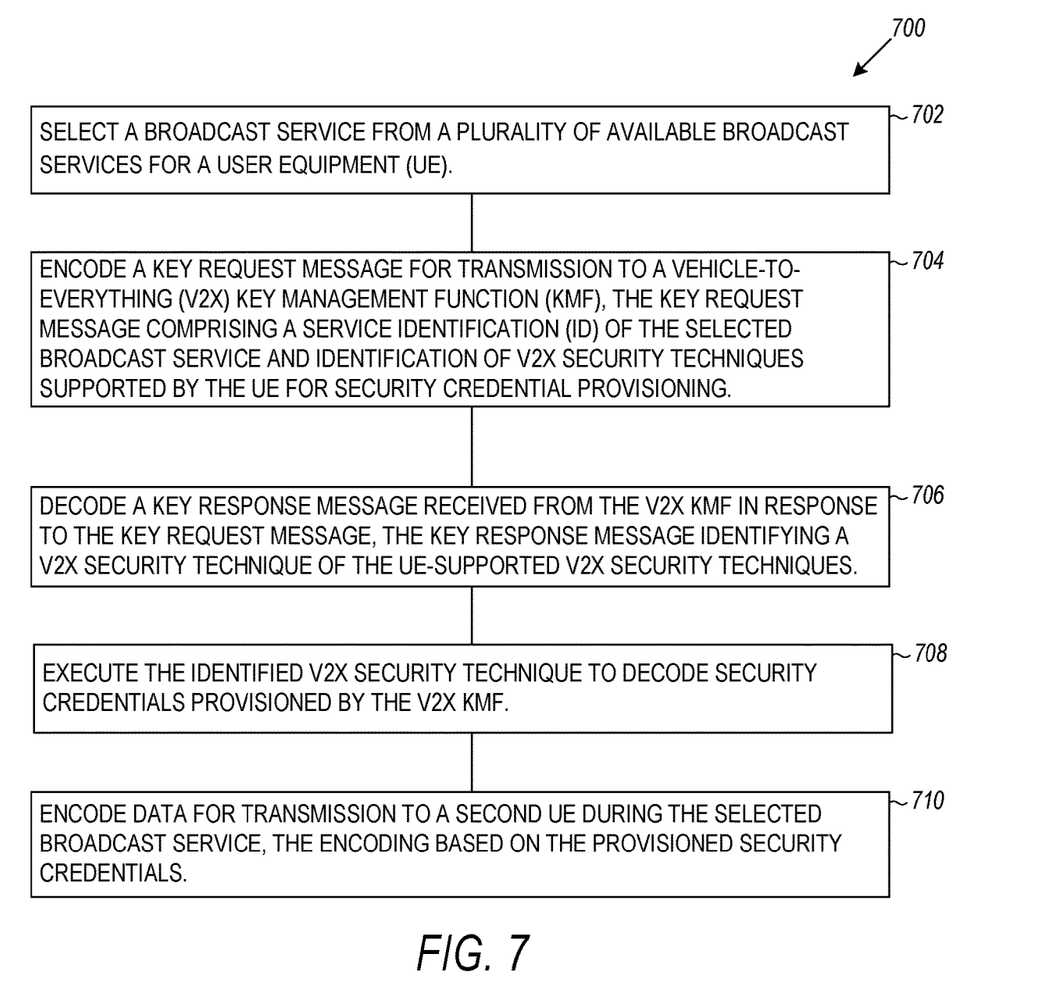
FIG. 7 is a flow diagram illustrating example functionalities for communication between a UE and a V2X control function (CF) and a V2X Key Management Function (KMF), in accordance with an example embodiment.

FIG. 7 is a flow diagram illustrating example functionalities for communication between a UE and a V2X control function (CF) and a V2X Key Management Function (KMF), in accordance with an example embodiment. Referring to FIG. 2 and FIG. 7, the example method 700 may start at 702, when a broadcast service may be selected from a plurality of available broadcast services. For example, the UE 202 may receive a list of available services offered by the operators and affiliated service providers (e.g., from the V2X CF 206). At 704, a key request message can be encoded for transmission to the V2X KMF. For example, UE 202 may encode the key request message at 216. The key request message may include a service identification (ID) of a selected broadcast service and identification of V2X security techniques supported by the UE for security credential provisioning. At 706, a key response message received from the V2X KMF in response to the key request message may be decoded. For example, the key response message may be received by the UE 202 at 220. The key response message may identify a V2X security technique of the UE-supported V2X security techniques. At 708, the UE 202 may execute the identified V2X security technique to decode security credentials provisioned by the V2X KMF (e.g., as described in reference to FIG. 3 or 4). At 710, data may be encoded for transmission to a second UE during the selected broadcast service. For example, data may be exchanged between UEs 202 and 224 using the provisioned security credentials (e.g., the data may be encoded using the provisioned security credentials).

Figure 8:
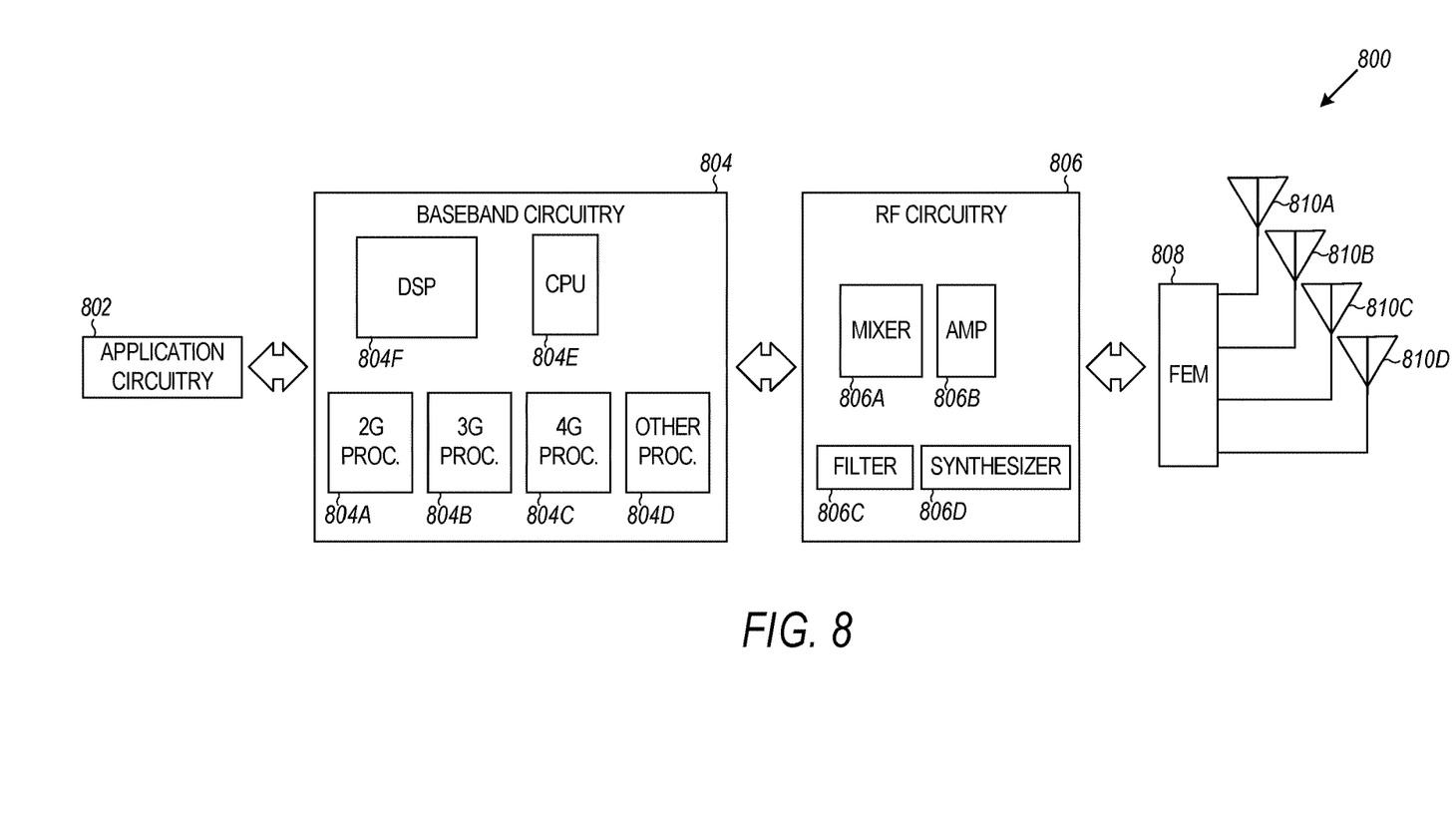
FIG. 8 is a block diagram of a User Equipment (UE) in accordance with some embodiments.

FIG. 8 is a block diagram of a User Equipment (UE) in accordance with some embodiments. The UE 800 may be suitable for use as a UE 102 as depicted in FIG. 1. In some embodiments, the UE 800 may include application circuitry 802, baseband circuitry 804, Radio Frequency (RF) circuitry 806, front-end module (FEM) circuitry 808, and multiple antennas 810A-810D, coupled together at least as shown. In some embodiments, other circuitry or arrangements may include one or more elements or components of the application circuitry 802, the baseband circuitry 804, the RF circuitry 806 or the FEM circuitry 808, and may also include other elements or components in some cases. As an example, "processing circuitry" may include one or more elements or components, some or all of which may be included in the application circuitry 802 or the baseband circuitry 804. As another example, "transceiver circuitry" may include one or more elements or components, some or all of which may be included in the RF circuitry 806 or the FEM circuitry 808. These examples are not limiting, however, as the processing circuitry or the transceiver circuitry may also include other elements or components in some cases.

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the system to perform one or more of the functionalities described herein.

The baseband circuitry 804 may include circuitry such as, but not limited to, one or more single-core or multi-core processors. The baseband circuitry 804 may include one or more baseband processors or control logic to process baseband signals received from a receive signal path of the RF circuitry 806 and to generate baseband signals for a transmit signal path of the RF circuitry 806. Baseband processing circuitry 804 may interface with the application circuitry 802 for generation and processing of the baseband signals and for controlling operations of the RF circuitry 806. For example, in some embodiments, the baseband circuitry 804 may include a second generation (2G) baseband processor 804a, third generation (3G) baseband processor 804b, fourth generation (4G) baseband processor 804c, or other baseband processor(s) 804d for other existing generations, generations in development or to be developed in the future (e.g., fifth generation (5G), 6G, etc.). The baseband circuitry 804 (e.g., one or more of baseband processors 804a-d) may handle various radio control functions that enable communication with one or more radio networks via the RF circuitry 806. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, or constellation mapping/demapping functionality. In some embodiments, encoding/decoding circuitry of the baseband circuitry 804 may include Low Density Parity Check (LDPC) encoder/decoder functionality, optionally alongside other techniques such as, for example, block codes, convolutional codes, turbo codes, or the like, which may be used to support legacy protocols. Embodiments of modulation/demodulation and encoder/decoder functionality are not limited to these examples and may include other suitable functionality in other embodiments.

In some embodiments, the baseband circuitry 804 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), or radio resource control (RRC) elements. A central processing unit (CPU) 804e of the baseband circuitry 804 may be configured to run elements of the protocol stack for signaling of the PHY, MAC, RLC, PDCP or RRC layers. In some embodiments, the baseband circuitry may include one or more audio digital signal processor(s) (DSP) 804f. The audio DSP(s) 804f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on chip (SOC).

In some embodiments, the baseband circuitry 804 may provide for communication compatible with one or more radio technologies. For example, in some embodiments, the baseband circuitry 804 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the RF circuitry 806 may include a receive signal path and a transmit signal path. The receive signal path of the RF circuitry 806 may include mixer circuitry 806*a*, amplifier circuitry 806*b* and filter circuitry 806*c*. The transmit signal path of the RF circuitry 806 may include filter circuitry 806*c* and mixer circuitry 806*a*. RF circuitry 806 may also include synthesizer circuitry 806*d* for synthesizing a frequency for use by the mixer circuitry 806*a* of the receive signal path and the transmit signal path. In some embodiments, the mixer circuitry 806*a* of the receive signal path may be configured to down-convert RF signals received from the FEM circuitry 808 based on the synthesized frequency provided by synthesizer circuitry 806*d*. The amplifier circuitry 806*b* may be configured to amplify the down-converted signals and the filter circuitry 806*c* may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, mixer circuitry 806*a* of the receive signal path may comprise passive mixers, although the scope of the embodiments is not limited in this respect. In some embodiments, the mixer circuitry 806*a* of the transmit signal path may be configured to up-convert input baseband signals based on the synthesized frequency provided by the synthesizer circuitry 806*d* to generate RF output signals for the FEM circuitry 808. The baseband signals may be provided by the baseband circuitry 804 and may be filtered by filter circuitry 806*c*. The filter circuitry 806*c* may include a low-pass filter (LPF), although the scope of the embodiments is not limited in this respect.

In some embodiments, the mixer circuitry 806*a* of the receive signal path and the mixer circuitry 806*a* of the transmit signal path may include two or more mixers and may be arranged for quadrature downconversion or upconversion respectively. In some embodiments, the mixer circuitry 806*a* of the receive signal path and the mixer circuitry 806*a* of the transmit signal path may include two or more mixers and may be arranged for image rejection (e.g., Hartley image rejection). In some embodiments, the mixer circuitry 806*a* of the receive signal path and the mixer circuitry 806*a* may be arranged for direct downconversion or direct upconversion, respectively. In some embodiments, the mixer circuitry 806*a* of the receive signal path and the mixer circuitry 806*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806. In some dual-mode embodiments, a separate radio IC circuitry may be provided for processing signals for each spectrum, although the scope of the embodiments is not limited in this respect.

In some embodiments, the synthesizer circuitry 806*d* may be a fractional-N synthesizer or a fractional N/N+1 synthesizer, although the scope of the embodiments is not limited in this respect as other types of frequency synthesizers may be suitable. For example, synthesizer circuitry 806*d* may be a delta-sigma synthesizer, a frequency multiplier, or a synthesizer comprising a phase-locked loop with a frequency divider. The synthesizer circuitry 806*d* may be configured to synthesize an output frequency for use by the mixer circuitry 806*a* of the RF circuitry 806 based on a frequency input and a divider control input. In some embodiments, the synthesizer circuitry 806*d* may be a fractional N/N+1 synthesizer. In some embodiments, frequency input may be provided by a voltage controlled oscillator (VCO), although that is not a requirement. Divider control input may be provided by either the baseband circuitry 804 or the applications processor 802 depending on the desired output frequency. In some embodiments, a divider control input (e.g., N) may be determined from a look-up table based on a channel indicated by the applications processor 802.

Synthesizer circuitry 806*d* of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path, which may include circuitry configured to operate on RF signals received from one or more of the antennas 810A-D, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810A-D.

In some embodiments, the FEM circuitry 808 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810. In some embodiments, the UE 800 may include additional elements such as, for example, memory/storage, display, camera, sensor, or input/output (I/O) interface.

Figure 9:
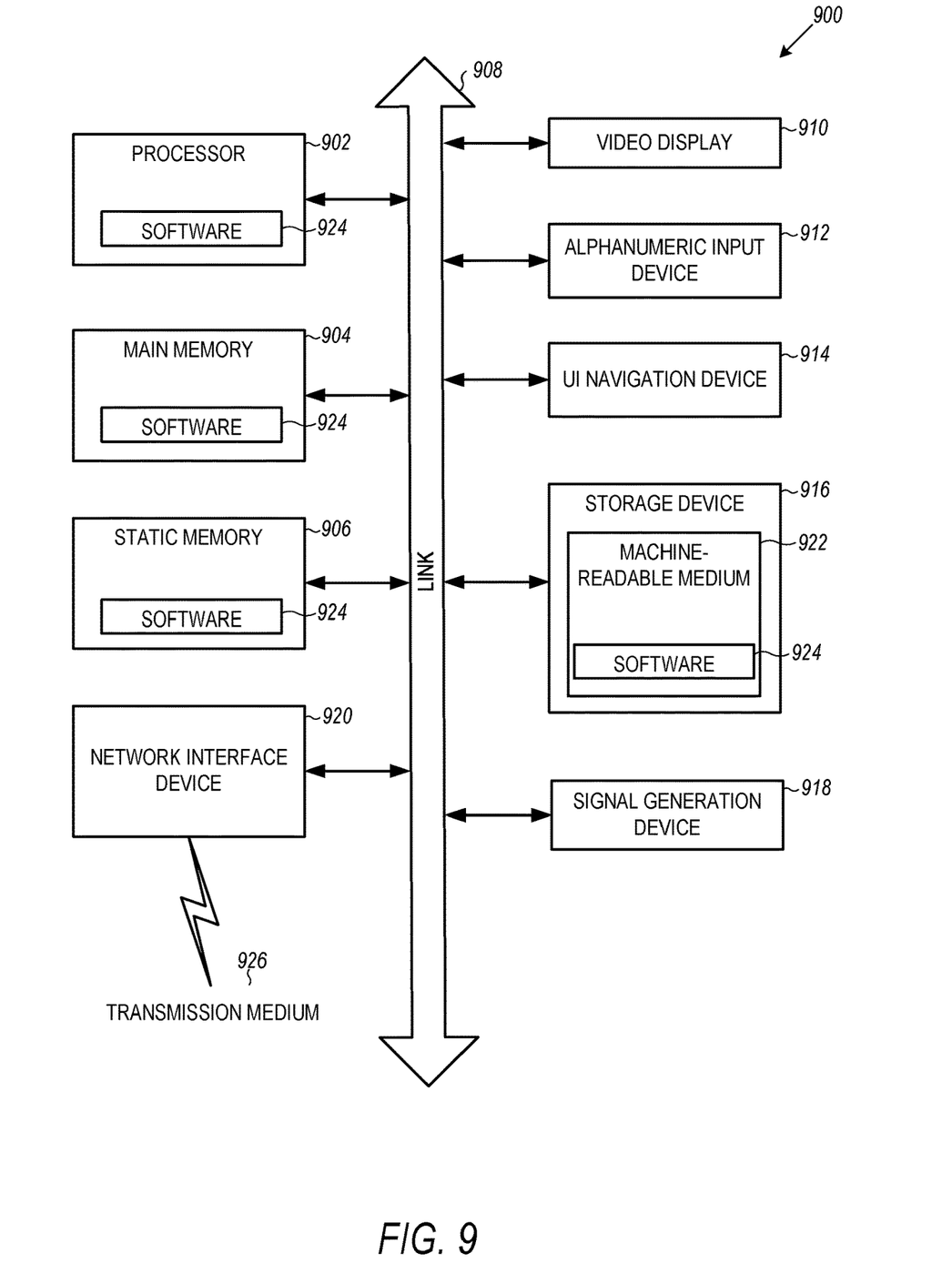
FIG. 9 illustrates a block diagram of a communication device such as an eNB or a UE, in accordance with some embodiments.

FIG. 9 illustrates a block diagram of a communication device such as an eNB or a UE, in accordance with some embodiments. In alternative embodiments, the communication device 900 may operate as a standalone device or may be connected (e.g., networked) to other communication devices. In a networked deployment, the communication device 900 may operate in the capacity of a server communication device, a client communication device, or both in server-client network environments. In an example, the communication device 900 may act as a peer communication device in peer-to-peer (P2P) (or other distributed) network environment. The communication device 900 may be a UE, eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., UE) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The communication device 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The communication device 900 may additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The communication device 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 916 may include a communication device readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the communication device 900. In an example, one or any combination of the hardware processor 902, the main memory 904, the static memory 906, or the storage device 916 may constitute communication device readable media.

While the communication device readable medium 922 is illustrated as a single medium, the term "communication device readable medium" may include a single medium or multiple media (e.g., a centralized or distributed database, and/or associated caches and servers) configured to store the one or more instructions 924.

The term "communication device readable medium" may include any medium that is capable of storing, encoding, or carrying instructions for execution by the communication device 900 and that cause the communication device 900 to perform any one or more of the techniques of the present disclosure, or that is capable of storing, encoding or carrying data structures used by or associated with such instructions. Non-limiting communication device readable medium examples may include solid-state memories, and optical and magnetic media. Specific examples of communication device readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device readable media may include non-transitory communication device readable media. In some examples, communication device readable media may include communication device readable media that is not a transitory propagating signal.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), MIMO, or multiple-input single-output (MISO) techniques. In some examples, the network interface device 920 may wirelessly communicate using Multiple User MIMO techniques. The term "transmission medium" shall be taken to include any intangible medium that is capable of storing, encoding or carrying instructions for execution by the communication device 900, and includes digital or analog communications signals or other intangible medium to facilitate communication of such software.

Additional Notes and Examples:

Example 1 is an apparatus of a user equipment (UE) configured to communicate with a vehicle-to-everything (V2X) control function (CF) and a V2X Key Management Function (KMF), the UE comprising: memory; and processing circuitry, configured to: select a broadcast service from a plurality of available broadcast services; encode a key request message for transmission to the V2X KMF, the key request message comprising a service identification (ID) of the selected broadcast service and identification of V2X security techniques supported by the UE for security credential provisioning; decode a key response message received from the V2X KMF in response to the key request message, the key response message identifying a V2X security technique of the UE-supported V2X security techniques; execute the identified V2X security technique to decode security credentials provisioned by the V2X KMF; and encode data for transmission to a second UE during the selected broadcast service, the encoding based on the provisioned security credentials.

In Example 2, the subject matter of Example 1 optionally includes wherein the processing circuitry is further configured to: acquire at least one of a private key and a root certificate for communication with the V2X KMF.

In Example 3, the subject matter of any one or more of Examples 1-2 optionally include wherein the processing circuitry is further configured to: acquire a list of the plurality of available broadcast services within a message received from the V2X CF for selecting a broadcast service to communicate with another UE.

In Example 4, the subject matter of Example 3 optionally includes wherein the processing circuitry is further configured to: acquire an address of the V2X KMF within the message received from the V2X CF to communicate with the V2X KMF.

In Example 5, the subject matter of any one or more of Examples 1-4 optionally include wherein the V2X security techniques comprise one of: security credential provisioning with identity-based cryptography; and security credential provisioning with certificate-based cryptography.

In Example 6, the subject matter of any one or more of Examples 1-5 optionally include wherein the key response message includes the service ID and identification of the V2X security technique for provisioning the security credentials for the selected broadcast service.

In Example 7, the subject matter of any one or more of Examples 1-6 optionally include wherein the key response message includes an indicator of algorithm support failure when the V2X security techniques are unsupported for provisioning the security credentials for the selected broadcast service.

In Example 8, the subject matter of any one or more of Examples 1-7 optionally include wherein to execute the identified V2X security technique, the processing circuitry is further configured to: encode a request message for identity-based security credentials for communication to the V2X KMF, the request message comprising identification information of the UE and the service ID.

In Example 9, the subject matter of Example 8 optionally includes wherein the processing circuitry is further configured to: decode the security credentials in a response message received from the V2X KMF, the security credentials comprising, when the UE is to act as signer and a verifier during the selected broadcast service: a signing secret key (SSK); a public verification token (PVK); a key management server (KMS) public key; a KMS ID; and a list of trusted KMS ID and KMS public key pairs.

In Example 10, the subject matter of any one or more of Examples 8-9 optionally include wherein the processing circuitry is further configured to: decode the security credentials in a response message received from the V2X KMF, the security credentials comprising, when the UE is to act only as a verifier during the selected broadcast service: a key management server (KMS) public key; a KMS ID; and a list of trusted KMS ID and KMS public key pairs.

In Example 11, the subject matter of any one or more of Examples 8-10 optionally include wherein the identification information of the UE comprises a concatenation of a fixed part and a timestamp, the fixed part comprising at least one of: an international mobile subscriber identity (IMSI) of the UE; a Session Initiation Protocol (SIP) Uniform Resource Identifier (URI) of the UE; and a telephone (TEL) URI of the UE.

In Example 12, the subject matter of any one or more of Examples 1-11 optionally include a transceiver coupled to an antenna, the transceiver configured to receive the key response message from the V2X KMF.

Example 13 is an apparatus of a vehicle-to-everything (V2X) Key Management Function (KMF) configured to communicate with a user equipment (UE) and a V2X control function (CF), the V2X KMF apparatus comprising: memory; and processing circuitry configured to: decode a key request message received from the UE, the key request message comprising a service identification (ID) of a broadcast service selected by the UE and identification of V2X security techniques supported by the UE for security credential provisioning; select a V2X security technique for provisioning security credentials of the broadcast service; determine whether the selected security technique is included in the identified V2X security techniques; upon determining the selected security technique is included in the identified V2X security techniques supported by the UE, encode a key response message for transmission to the UE, the key response message identifying the selected V2X security technique; and provision the security credentials for transmission to the UE.

In Example 14, the subject matter of Example 13 optionally includes wherein the processing circuitry is further configured to: encode the key response message to include an indicator of algorithm support failure, when the selected V2X security technique is not included in the identified V2X security techniques supported by the UE.

In Example 15, the subject matter of any one or more of Examples 13-14 optionally include wherein to provision the security credentials, the processing circuitry is further configured to: decode a request message for identity-based security credentials received from the UE, the request message comprising identification information of the UE and the service ID.

In Example 16, the subject matter of Example 15 optionally includes wherein the processing circuitry is further configured to: acquire a confirmation from the V2X CF that the UE is authorized to perform the selected broadcast service with the service ID.

In Example 17, the subject matter of Example 16 optionally includes wherein the processing circuitry is further configured to: encode the security credentials in a response message for transmission to the UE, the security credentials comprising, when the UE is to act as signer and a verifier during the selected broadcast service: a signing secret key (SSK); a public verification token (PVK); a key management server (KMS) public key; a KMS ID; and a list of trusted KMS ID and KMS public key pairs.

In Example 18, the subject matter of any one or more of Examples 16-17 optionally include wherein the processing circuitry is further configured to: encode the security credentials in a response message for transmission to the UE, the security credentials comprising, when the UE is to act only as a verifier during the selected broadcast service: a key management server (KMS) public key; a KMS ID; and a list of trusted KMS ID and KMS public key pairs.

Example 19 is a computer-readable storage medium that stores instructions for execution by one or more processors of a user equipment (UE) configured to communicate with a vehicle-to-everything (V2X) control function (CF) and a V2X Certification Authority (CA), the one or more processors to configure the UE to: acquire at least one of a private key and a root certificate for communication with the V2X CA; select a broadcast service from a plurality of available broadcast services; encode a certificate request message for transmission to the V2X CA, the certificate request message comprising a service identification (ID) of the selected broadcast service and identification of V2X security techniques supported by the UE for security credential provisioning; decode a certificate response message received from the V2X CA in response to the certificate request message, the certificate response message identifying a V2X security technique of the UE-supported V2X security techniques; execute the identified V2X security technique to decode security credentials provisioned by the V2X CA; and encode data for transmission to a second UE during the selected broadcast service, the encoding based on the provisioned security credentials.

In Example 20, the subject matter of Example 19 optionally includes wherein the one or more processors further configure the UE to: acquire a list of the plurality of available broadcast services within a message received from the V2X CF for selecting a broadcast service to communicate with another UE in a direct device-to-device communication.

In Example 21, the subject matter of Example 20 optionally includes wherein the one or more processors further configure the UE to: acquire an address of the V2X CA within the message received from the V2X CF to communicate with the V2X CA.

In Example 22, the subject matter of any one or more of Examples 19-21 optionally include wherein to execute the identified V2X security technique, the one or more processors further configure the UE to: encode a request message for certificate-based security credentials for communication to the V2X CA, the request message comprising a self-signed certificate issued by the UE.

In Example 23, the subject matter of Example 22 optionally includes wherein the processing circuitry is further configured to: decode the security credentials in a response message received from the V2X CA, the security credentials comprising: a UE certificate signed by the V2X CA; a CA root certificate; and a set of root certificates trusted by the V2X CA as UE's trust anchor.

Example 24 is a computer-readable storage medium that stores instructions for execution by one or more processors of a vehicle-to-everything (V2X) Certification Authority (CA) configured to communicate with a user equipment (UE) and a V2X control function (CF), the one or more processors to configure the V2X CA to: decode a certificate request message received from the UE, the certificate request message comprising a service identification (ID) of a broadcast service selected by the UE and identification of V2X security techniques supported by the UE for security credential provisioning; select a V2X security technique for provisioning certificate-based security credentials of the broadcast service; determine whether the selected security technique is included in the identified V2X security techniques; upon determining the selected security technique is included in the identified V2X security techniques supported by the UE, encode a certificate response message for transmission to the UE, the key response message identifying the selected V2X security technique; and provision the certificate-based security credentials for transmission to the UE.

In Example 25, the subject matter of Example 24 optionally includes wherein to provision the certificate-based security credentials, the one or more processors further configure the V2X CA to: decode a request message for the certificate-based security credentials received from the UE, the request message comprising a self-signed certificate issued by the UE.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An apparatus of a user equipment (UE) configured to communicate with a vehicle-to-everything (V2X) control function (V2X CF) and a V2X Key Management Function (V2X KMF), the UE comprising:
    memory; and
    processing circuitry, configured to:
        select a broadcast service from a plurality of available broadcast services; encode a key request message for transmission to the V2X KMF, the key request message comprising a service identification (ID) of the selected broadcast service and identification of V2X security techniques supported by the UE for security credential provisioning associated with a V2X communication directly between the UE and a second UE;
        decode a key response message received from the V2X KMF in response to the key request message, the key response message identifying a V2X security technique of the UE-supported V2X security techniques identified by the request message;
        execute the identified V2X security technique to decode security credentials provisioned by the V2X KMF for the V2X communication with the second UE; and
        encode data for transmission to the second UE during the selected broadcast service, the encoding based on the provisioned security credentials.

2. The apparatus of claim 1, wherein the processing circuitry is further configured to:
    acquire at least one of a private key and a root certificate for communication with the V2X KMF.

3. The apparatus of claim 1, wherein the processing circuitry is further configured to:
    acquire a list of the plurality of available broadcast services within a message received from the V2X CF for selecting a broadcast service to communicate with another UE.

4. The apparatus of claim 3, wherein the processing circuitry is further configured to:
    acquire an address of the V2X KMF within the message received from the V2X CF to communicate with the V2X KMF.

5. The apparatus of claim 1, wherein the V2X security techniques comprise one of:
    security credential provisioning with identity-based cryptography; and
    security credential provisioning with certificate-based cryptography.

6. The apparatus of claim 1, wherein the key response message includes the service ID and identification of the V2X security technique for provisioning the security credentials for the selected broadcast service.

7. The apparatus of claim 1, wherein the key response message includes an indicator of algorithm support failure when the V2X security techniques are unsupported for provisioning the security credentials for the selected broadcast service.

8. The apparatus of claim 1, wherein to execute the identified V2X security technique, the processing circuitry is further configured to:
    encode a request message for identity-based security credentials for communication to the V2X :KMF the request message comprising identification information of the UE and the service ID.

9. The apparatus of claim 8, wherein the processing circuitry is further configured to:
    decode the security credentials in a response message received from the V2X KMF; the security credentials comprising, when the UE is to act as signer and a verifier during the selected broadcast service:
        a signing secret key (SSK);
        a public verification token (PYK);
        a key management server (KMS) public key;
        a KMS ID; and
        a list of trusted KMS ID and KMS public key pairs.

10. The apparatus of claim 8, wherein the processing circuitry is further configured to:
    decode the security credentials in a response message received from the V2X KMF, the security credentials comprising, when the UE is to act only as a verifier during the selected broadcast service:
        a key management server (KMS) public key;
        a KMS :ID; and
        a list of trusted KMS ID and KMS public key pairs.

11. The apparatus of claim 8, wherein the identification information of the UE comprises a concatenation of a fixed part and a timestamp, the fixed part comprising at least one of:
    an international mobile subscriber identity (IMSI) of the UE;
    a Session Initiation Protocol (SIP) Uniform Resource Identifier (URI) of the UE; and
    a telephone (TEL) URI of the UE.

12. The apparatus of claim 1, further comprising:
    a transceiver coupled to an antenna, the transceiver configured to receive the key response message from the V2X KMF.

13. An apparatus of a vehicle-to-everything (V2X) Key Management Function (V2X KMF) configured to communicate with a user equipment (UE) and a V2X control function (V2X CF), the V2X KMF apparatus comprising:
    memory; and
    processing circuitry configured to:
        decode a key request message received from the UE, the key request message comprising a service identification (ID) of a broadcast service selected by the UE and identification of V2X security techniques supported by the UE for security credential provisioning associated with a V2X communication between the UE and a second UE;
        select a V2X security technique of the V2X security techniques for provisioning security credentials of the broadcast sendee identified by the service ID:
        determine whether the selected security technique is included in the identified V2X security techniques;
        upon determining the selected security technique is included in the identified V2X security techniques supported by the UE, encode a key response message for transmission to the UE, the key response message identifying the selected V2X security technique, and provision the security credentials for transmission to the UE.

14. The apparatus of claim 13, wherein the processing circuitry is further configured to:
encode the key response message to include an indicator of algorithm support failure, when the selected V2X security technique is not included in the identified V2X security techniques supported by the UE.

15. The apparatus of claim 13, wherein to provision the security credentials, the processing circuitry is further configured to:
decode a request message for identity-based security credentials received from the UE, the request message comprising identification information of the UE and the service ID.

16. The apparatus of claim 15, wherein the processing circuitry is further configured to:
acquire a confirmation from the V2X CF that the UE is authorized to perform the selected broadcast service with the service ID.

17. The apparatus of claim 16, wherein erein the processing circuitry is further configured to:
encode the security credentials in a response message for transmission to the UE, the security credentials comprising, when the UE is to act as signer and a verifier during the selected broadcast service:
a signing secret key (SSK);
a public verification token (PVK);
a key management server (KMS) public key;
a KMS ID; and
a list of trusted KMS ID and KMS public key pairs.

18. The apparatus of claim 16, wherein the processing circuitry is further configured to:
encode the security credentials in a response message for transmission to the UE, the security credentials comprising, when the UE is to act only as a verifier during the selected broadcast service:
a key management server (KMS) public key;
a KMS ID; and
a list of trusted KMS ID and KMS public key pairs.

19. A non-transitory computer-readable storage medium that stores instructions for execution by one or more processors of a user equipment (UE) configured to communicate with a vehicle-to-everything (V2X) control function (V2X CF) and a V2X Certification Authority (V2X CA), the one or more processors to configure the UE to: acquire at least one of a private key and a root certificate for communication with the V2X CA;
select a broadcast sendee from a plurality of available broadcast services;
encode a certificate request message for transmission to the V2X CA, the certificate request message comprising a sendee identification (D) of the selected broadcast service and identification of V2X security techniques supported by the UE for security credential provisioning associated with a V2X communication between the UE and a second UE;
decode a certificate response message received from the V2X CA in response to the certificate request message, the certificate response message identifying a V2X security technique of the UE-supported V2X security techniques identified by the certificate request message;
execute the identified V2X security technique to decode security credentials provisioned by the V2X CA for the V2X communication with the second UE; and
encode data for transmission to a second UE during the selected broadcast service, the encoding based on the provisioned security credentials.

20. The computer-readable storage medium of claim 19, wherein the one or more processors further configure the liE to:
acquire a list of the plurality of available broadcast services within a message received from the V2X CF for selecting a broadcast service to communicate with another UE in a direct device-to-device communication.

21. The computer-readable storage medium of claim 20, wherein the one or more processors further configure the UE to:
acquire an address of the V2X CA within the message received from the V2X CF to communicate with the V2X CA.

22. The computer-readable storage medium of claim 19, wherein to execute the identified V2X security technique, the one or more processors further configure the UE to:
encode a request message for certificate-based security credentials for communication to the V2X CA, the request message comprising a self-signed certificate issued by the UE.

23. The computer-readable storage medium of claim 22, wherein the processing circuitry is further configured to:
decode the security credentials in a response message received from the V2X CA, the security credentials comprising:
a UE certificate signed by the V2X CA;
a CA root certificate; and
a set of root certificates trusted by the V2X CA as UE's trust anchor.

24. A non-transitory computer-readable storage medium that stores instructions for execution by one or more processors of a vehicle-to-everything (V2X) Certification Authority (V2X CA) configured to communicate with a user equipment (UE) and a V2X control function (V2X CF), the one or more processors to configure the V2X CA to:
decode a certificate request message received from the UE, the certificate request message comprising a sendee identification (ID) of a broadcast service selected by the UE and identification of V2X security techniques supported by the UE for security credential provisioning associated with a V2X communication between the UE and a second UE:
select a V2X security technique of the identified V2X security techniques for provisioning certificate-based security credentials of the broadcast service;
determine whether the selected security technique is included in the identified V2X security techniques;
upon determining the selected security technique is included in the identified V2X security techniques supported by the UE, encode a certificate response message for transmission to the UE, the key-certificate response message identifying the selected V2X security technique; and
provision the certificate-based security credentials for transmission to the UE.

25. The computer-readable storage medium of claim 24, wherein to provision the certificate-based security credentials, the one or more processors further configure the V2X CA to:
decode a request message for the certificate-based security credentials received from the UE, the request message comprising a self-signed certificate issued by the UE.

* * * * *

UNITED STATES PATENT AND TRADEMARK OFFICE
CERTIFICATE OF CORRECTION

PATENT NO. : 11,032,707 B2
APPLICATION NO. : 16/099004
DATED : June 8, 2021
INVENTOR(S) : Adrangi et al.

Page 1 of 1

It is certified that error appears in the above-identified patent and that said Letters Patent is hereby corrected as shown below:

In the Claims

In Column 17, Line 34, in Claim 1, after "the", insert --key--

In Column 18, Line 8, in Claim 8, delete ":KMF" and insert --KMF,-- therefor

In Column 18, Line 15, in Claim 9, delete "KMF;" and insert --KMF,-- therefor

In Column 18, Line 19, in Claim 9, delete "(PYK);" and insert --(PVK);-- therefor In Column 18, Line 30, in Claim 10, delete ":ID;" and insert --ID;-- therefor In Column 18, Line 61, in Claim 13, delete "ID:" and insert --ID;-- therefor In Column 19, Line 22, in Claim 17, after "wherein", delete "erein"

In Column 19, Line 54, in Claim 19, delete "(D)" and insert --(ID)-- therefor

In Column 20, Line 5, in Claim 20, delete "IiE" and insert --UE-- therefor

In Column 20, Line 44, in Claim 24, delete "UE:" and insert --UE;-- therefor

Signed and Sealed this
Eighth Day of February, 2022

Drew Hirshfeld
*Performing the Functions and Duties of the
Under Secretary of Commerce for Intellectual Property and
Director of the United States Patent and Trademark Office*